US006470929B2

(12) United States Patent
Fregeolle

(10) Patent No.: US 6,470,929 B2
(45) Date of Patent: Oct. 29, 2002

(54) PENCIL SHARPENER

(75) Inventor: Gerald P. Fregeolle, Stateville, NC (US)

(73) Assignee: Hunt Holdings, Inc., Wilmington, DE (US)

(*) Notice: Subject to any disclaimer, the term of this patent is extended or adjusted under 35 U.S.C. 154(b) by 12 days.

(21) Appl. No.: 09/823,121

(22) Filed: Mar. 30, 2001

(65) Prior Publication Data

US 2002/0139442 A1 Oct. 3, 2002

(51) Int. Cl.[7] .................................................. B23L 23/00
(52) U.S. Cl. ..................................... 144/28.72; 144/28.5
(58) Field of Search ........................... 30/452, 453, 454, 30/455; 144/28.1, 28.5, 28.6, 28.7, 28.72

(56) References Cited

U.S. PATENT DOCUMENTS

| | | | | |
|---|---|---|---|---|
| 3,777,791 A | | 12/1973 | Uchida | 144/28.72 |
| 3,937,239 A | * | 2/1976 | Bosland | 144/28.5 |
| 4,054,164 A | | 10/1977 | Kose et al. | 144/28.7 |
| 4,601,316 A | * | 7/1986 | Verdi | 144/28.72 |
| 4,755,074 A | | 7/1988 | Roberts | 401/52 |
| 4,759,129 A | | 7/1988 | Alpha | 30/452 |
| 4,918,816 A | | 4/1990 | Alpha | 30/452 |
| 4,966,208 A | | 10/1990 | Uang | 144/28.72 |

* cited by examiner

*Primary Examiner*—W. Donald Bray
(74) *Attorney, Agent, or Firm*—Synnestvedt & Lechner LLP

(57) ABSTRACT

A pencil sharpener including a self-governing sharpening assembly, a motor for driving the sharpening assembly, and a selector guide. The selector guide defines a plurality of openings positionable for aligning pencils of various sizes with the sharpening assembly. The sharpening assembly includes a rotary blade and a shaft having a reduced diameter portion. A blade holder defines a conical cavity for receiving a pencil and is driven by a drive shaft. A stop is connected to the lower end of the shaft and is slidably mounted to the blade holder in alignment with the conical cavity and is biased by a spring member to position the reduced diameter portion of the shaft away from the bearing lug of the blade holder. Sharpening ceases when a pencil moves the stop, causing receiving of the reduced diameter portion in a bearing lug and pivoting of the rotary blade away from the pencil.

22 Claims, 10 Drawing Sheets

PENCIL SHARPENER

FIELD OF THE INVENTION

This invention relates to sharpeners for wooden pencils.

BACKGROUND OF THE INVENTION

Manually operated and electrically powered pencil sharpeners are well known. When a pencil is inserted through a pencil-receiving opening of a pencil sharpener's housing, the pencil enters a sharpening assembly which cuts an outer layer of wood to expose and sharpen an inner core of lead or graphite.

Some manual pencil sharpeners include a selector guide. The selector guide has several openings sized to correspond to pencils of different thicknesses, for example, a standard adult size pencil (approximately 5⁄16 inch nominal size) or a larger diameter child size pencil (approximately 7⁄16 inch nominal size). The various openings of the selector guide are positionable in alignment with the pencil-receiving opening. The selector guide maintains proper alignment of the pencil with the sharpening assembly during the sharpening process.

Various configurations of electric pencil sharpeners are known. A common electric pencil sharpener has a sharpening assembly including a rotary means rotatable by a motor and cutter means operatively carried by the rotary means so as to rotate in a direction opposite to a rotational direction of the rotary means. U.S. Pat. No. 4,054,164 to Kose et al. and U.S. Pat. No. 4,966,208 to Uang, the disclosures of which are incorporated herein by reference, disclose such sharpening assemblies. While such pencil sharpeners are easy to use, they can quickly cause excess wear and waste of the pencil, i.e., by oversharpening. This problem is particularly acute with children lacking experience, judgment, and/or adequate hand/eye coordination.

Some electric pencil sharpeners include a self-governing sharpening assembly including a mechanism for preventing excess wear and/or oversharpening of a pencil. U.S. Pat. No. 3,777,791 to Uchida and U.S. Pat. No. 4,601,316 to Verdi, the disclosures of which are incorporated herein by reference, disclose exemplary self-governing sharpening assemblies. The sharpening assembly disclosed by Uchida prevents oversharpening by moving the cutter means away from the pencil when the pencil has a sufficiently sharp point. The pencil sharpener is adjustable to vary the degree of sharpness of the pencil before the cutter means is moved away from the pencil. Uchida discloses a variety of complex pivot mechanisms for providing such adjustability. Each of these mechanisms adds undesirable parts and manufacturing costs. Additionally, such pencil sharpeners are incapable of sharpening pencils of various sizes, particularly large diameter children's pencils.

What is needed is a pencil sharpener which includes a self-governing sharpening assembly and is capable of sharpening pencils of various sizes, as well as a simplified self-governing sharpening assembly.

SUMMARY OF THE INVENTION

The present invention provides a pencil sharpener having a self-governing sharpening assembly which is capable of sharpening pencils of various sizes. Additionally, the present invention provides a pencil sharpener having a simplified, economical self-governing sharpening assembly. In one embodiment, the pencil sharpener includes a safety mechanism which prevents operation of the pencil sharpener when the sharpener's receptacle is removed and the sharpening assembly is exposed. These features make the pencil sharpener ideal for use by children.

A pencil sharpener according to the present invention includes a housing defining a pencil-receiving opening and a self-governing sharpening assembly mounted on the housing in alignment with the pencil-receiving opening for sharpening pencils. The pencil sharpener also includes a motor operatively connected to the sharpening assembly for driving the sharpening assembly. A selector guide is mounted on the housing. The selector guide defines a plurality of openings. Each of the openings is smaller than the pencil-receiving opening and has a unique size corresponding to one of a plurality of common pencil sizes. Each of the plurality of openings is selectively positionable in alignment with the pencil-receiving opening for aligning a pencil with the sharpening assembly.

A self-governing sharpening assembly in accordance with the present invention includes a blade-supporting shaft having a lower end and an upper end having a reduced diameter portion. A rotary blade and a pinion are carried co-axially on the shaft. The rotary blade has spiral cutting edges. A blade holder defines a conical cavity for receiving an end of a pencil therein and has a bearing lug defining a bearing opening rotatably supporting the upper end of the shaft. The blade holder is supported by the housing to be rotatable around an axis of the conical cavity. An annular ring gear is fixedly supported by the housing and meshes with the pinion. A drive shaft drives the blade holder around the axis. A stop is slidably mounted to the blade holder in alignment with the conical cavity. The stop is connected to the lower end of the shaft. A spring member is supported by the blade holder. The spring member engages the stop and biases the reduced diameter portion of the shaft away from the bearing lug of the blade holder. A pencil advanced into the conical cavity is sharpened by the rotary blade until the pencil is sufficiently sharpened, at which point the pencil moves the stop against the spring bias, causing the reduced diameter portion of the shaft to enter the bearing opening of the bearing lug. The reduced diameter portion of the shaft is sized relatively to the bearing opening to allow for pivotal movement of the shaft and the rotary blade away from the pencil under influence of centrifugal force produced by rotation of the blade holder around the axis of said conical cavity, thereby ceasing sharpening and preventing oversharpening and/or waste of the pencil.

Optionally, the pencil sharpener may include a receptacle removably matable with the housing for receiving pencil shavings discharged from the sharpening assembly and/or a switch mounted on the housing for engaging any pencil inserted into the pencil-receiving opening. The switch is operatively connected to the motor and the sharpening assembly for driving the sharpening assembly when the switch is activated by any pencil inserted into the pencil-receiving opening.

DETAILED DESCRIPTION

Figure 1:
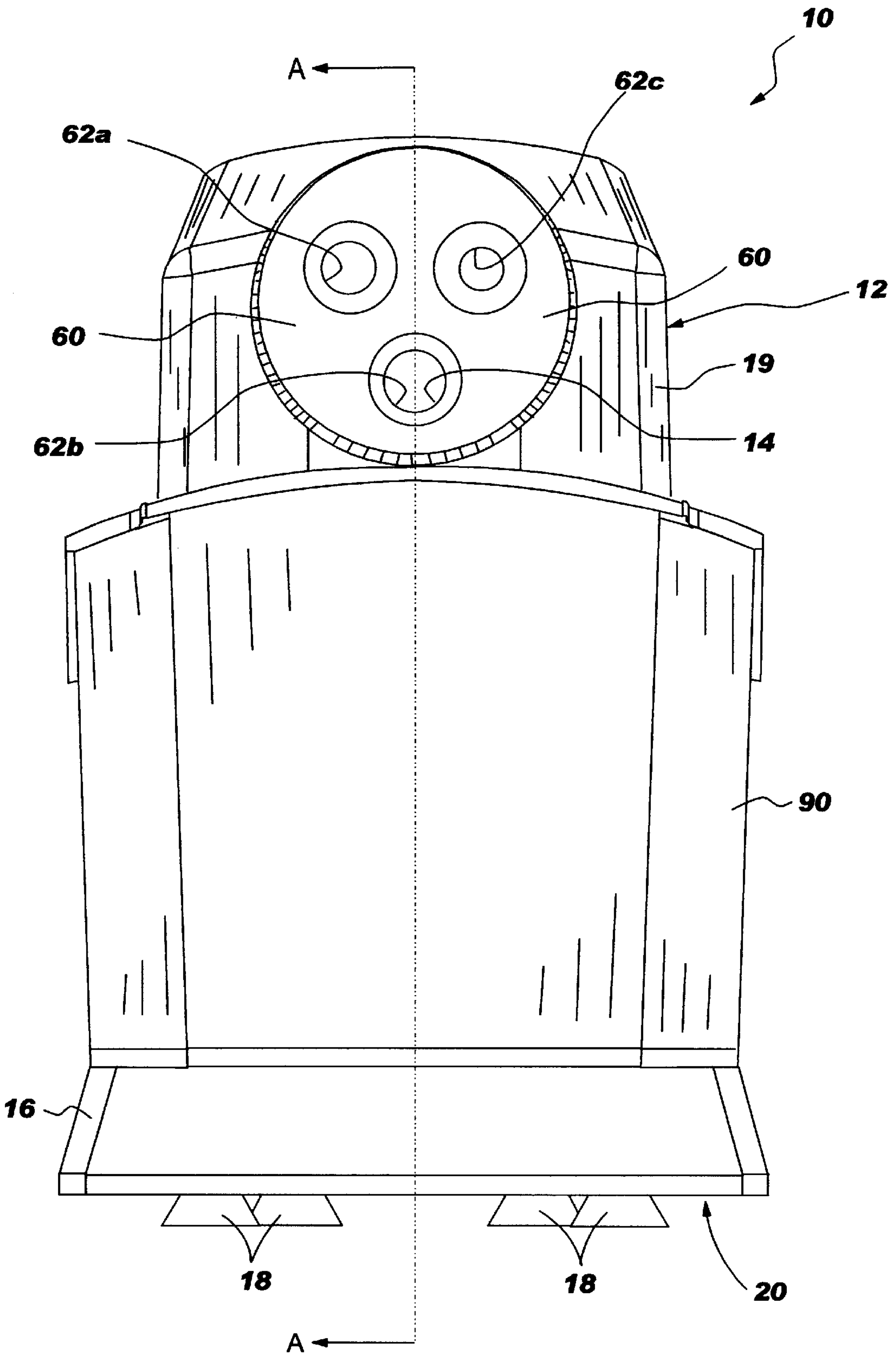
FIG. 1 is a front elevational view of an exemplary pencil sharpener in accordance with one embodiment of the present invention.

FIG. 1 is a front elevational view of an exemplary pencil sharpener 10 in accordance with the present invention. The pencil sharpener 10 has a housing 12 defining a pencil-receiving opening 14. The housing 12 is contoured for mating with a receptacle 90 for receiving pencil shavings. In one embodiment, a plurality of non-slip feet are mounted to an underside 20 of a base 16 of the housing 12 and the housing 12 includes a removable cover 19. The feet are preferably rubber suction cups 18, as shown in FIG. 1.

Figure 2:
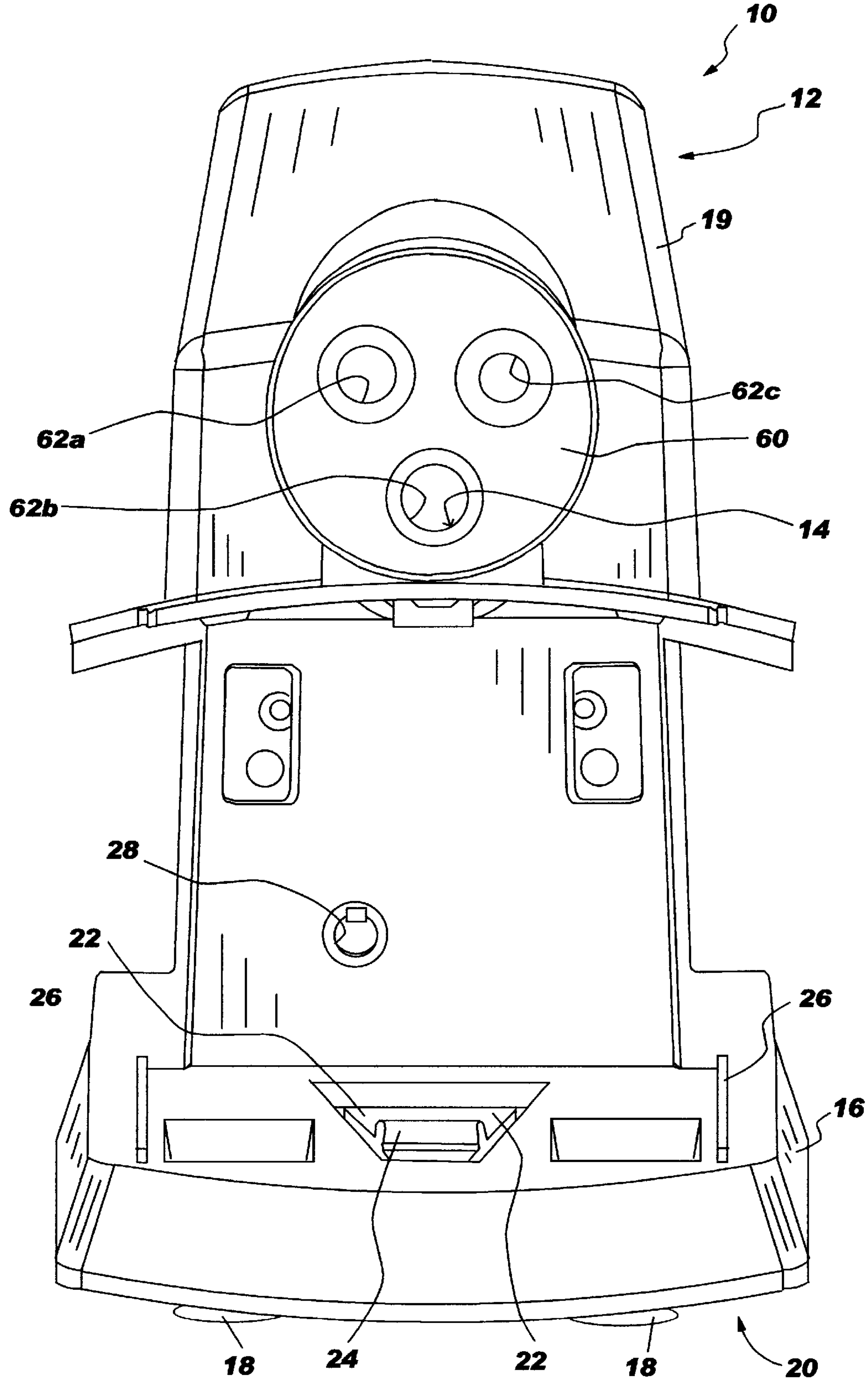
FIG. 2 is a perspective view of the pencil sharpener of FIG. 1 with the receptacle shown removed.
Figure 3:
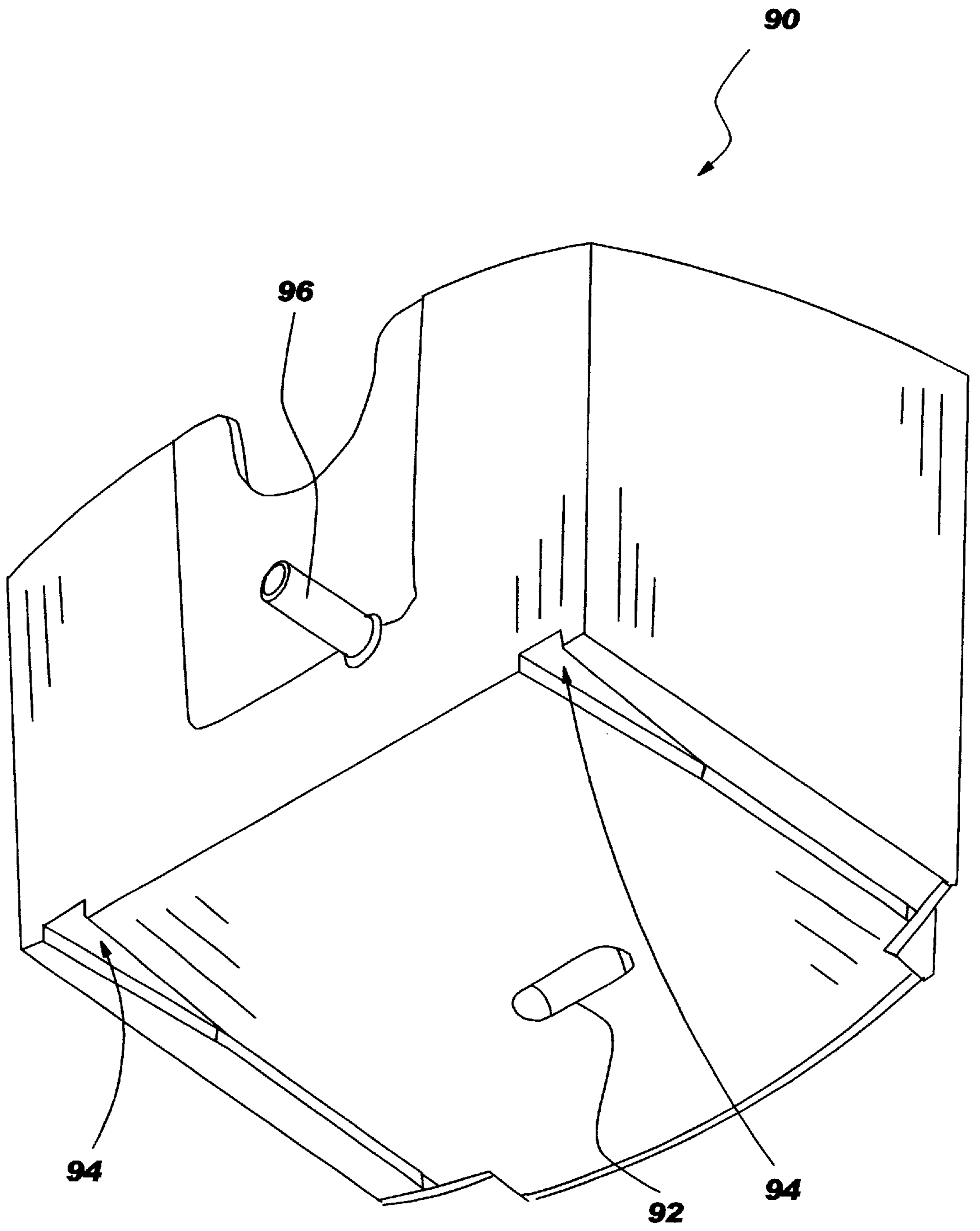
FIG. 3 is a perspective view of an exemplary receptacle in accordance with one embodiment of the present invention.
Figure 4A:
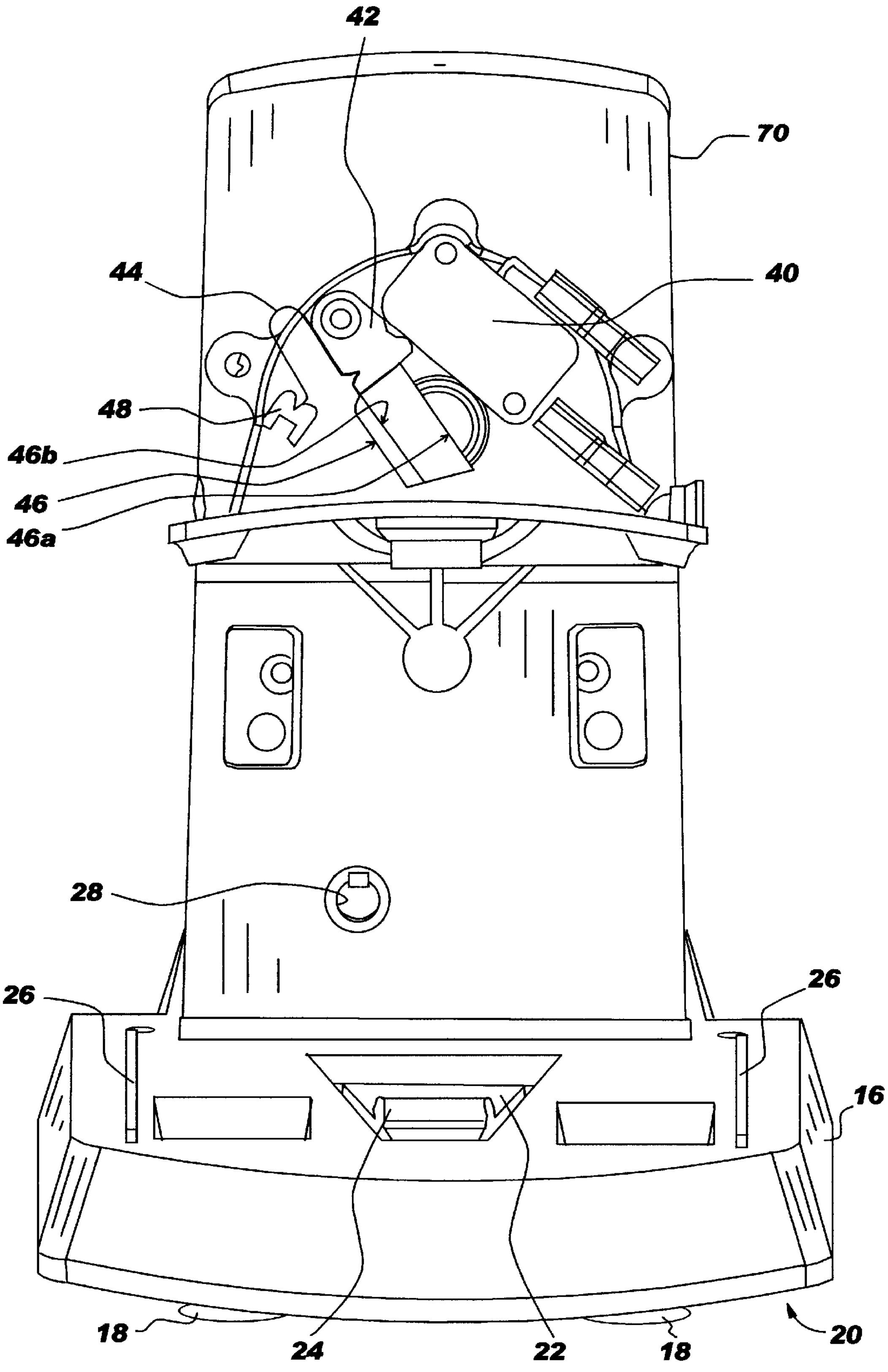
FIG. 4A is a front elevational view of the pencil sharpener of FIG. 1, showing a cover portion of the housing removed and a switch and trigger in an operative position.
Figure 5:
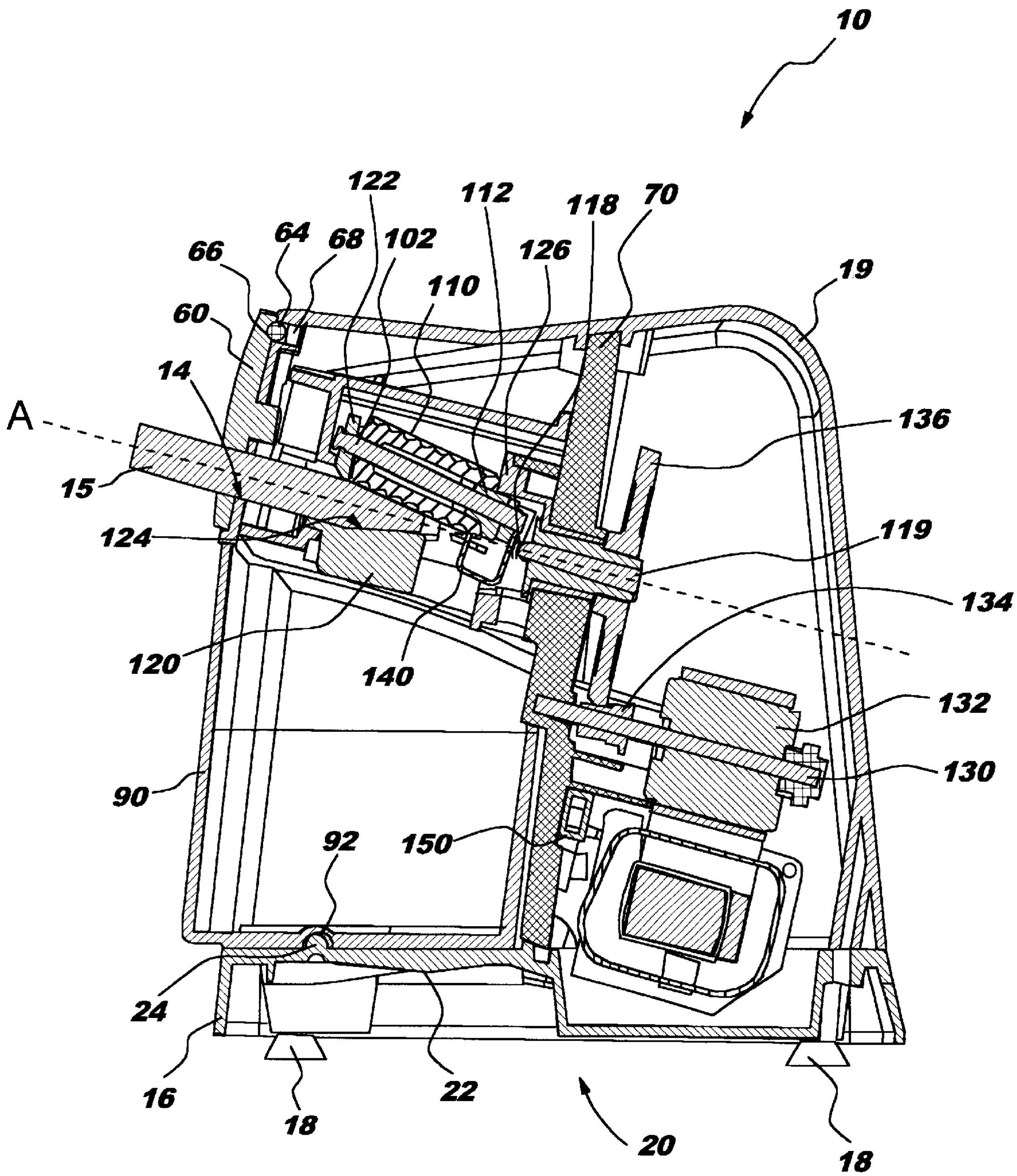
FIG. 5 is a cross-sectional view of the pencil sharpener of FIG. 1, taken along line A—A of FIG. 1.

Referring now to FIGS. 2, 4A and 5, the housing 12 preferably includes a resilient, cantilevered tang 22 having a latch portion 24. The latch portion 24 resiliently interfits within a recess 92 of receptacle 90, as shown in FIG. 3. In a highly preferred embodiment, the housing 12 further includes a pair of guide rails 26, as shown in FIG. 2, which interfit within grooves 94 of the receptacle 90 for guiding the receptacle 90 during mating with the housing 12, as shown in FIG. 3.

In an embodiment in which the pencil sharpener 10 includes a safety switch to prevent operation of the pencil sharpener with the receptacle removed, the housing 12 preferably defines a key-receiving opening 28 for receiving a key 96 of the receptacle 90, as discussed further below and shown in FIGS. 2 and 3. However, any configuration in which the safety switch is responsive to mating of the receptacle 90 with the housing 12 is acceptable to provide for safe operation of the pencil sharpener, i.e. operation only when the receptacle is mated with the housing and encloses the sharpening assembly.

The pencil sharpener 10 includes a self-governing sharpening assembly mounted on the housing 12 in alignment with the pencil receiving opening 14. A cutter assembly 100 of a self-governing sharpening assembly in accordance with a preferred embodiment of the present invention is shown in FIGS. 5–9. The cutter assembly 100 includes a blade-supporting shaft 102 (FIGS. 5 and 7) having a lower end 104 and an upper end 106. As shown in FIGS. 7–9, the upper end 106 has a reduced diameter portion 108.

Referring now to FIGS. 5 and 7, a rotary blade 110 and a gear-toothed pinion 112 of the cutter assembly 100 are carried co-axially on the shaft 102. The rotary blade 110 has spiral cutting edges 114 for sharpening a pencil 16.

As best shown in FIG. 7, a blade holder 120 of the cutter assembly 100 has a bearing lug 122 defining a bearing opening 123 rotatably supporting the upper end 106 of the shaft 102. The blade holder 120 defines a conical cavity 124 for receiving an end of a pencil 16. The blade holder 120 is supported by the housing 12 to be rotatable around an axis of the conical cavity 124 as shown in FIG. 5 and discussed further below.

The self-governing sharpening assembly also includes an annular ring gear 126 fixedly supported by the housing 12 and meshing with the pinion 112 as shown in FIG. 5.

As shown in FIG. 5, a drive shaft 130 of an electric motor assembly 132 is connected to a drive gear 134 which meshes with a carrier gear 136 supported by the housing 12. In the embodiment shown in FIG. 5, the housing 12 includes a mounting bracket 70 which supports the drive shaft 130, drive gear 134 and carrier gear 136. The carrier gear 136 is integrally connected with the blade holder 120 such that rotation of the carrier gear 136 causes rotation of the blade holder 120. Accordingly, the drive shaft 130 drives the blade holder 120 around the axis A of the conical cavity 124.

Figure 6:
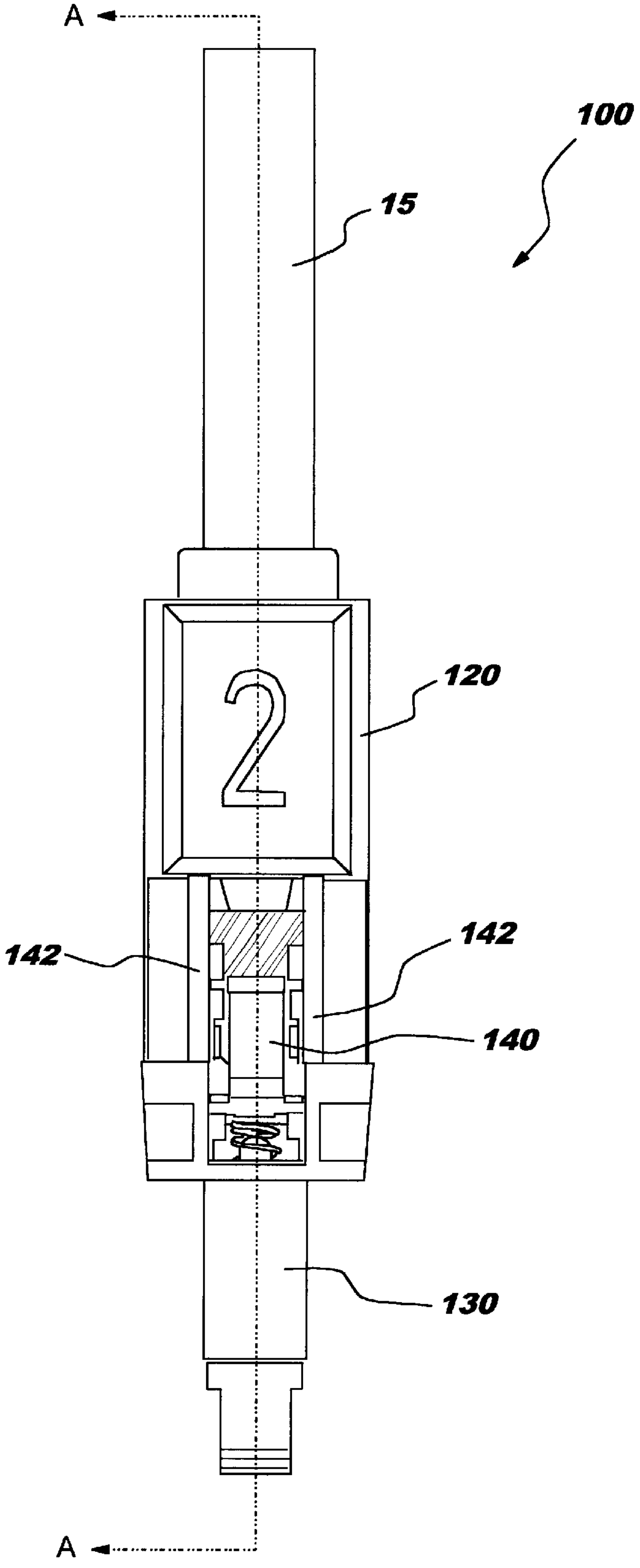
FIG. 6 is an elevational view of the cutter assembly of FIG. 4A.
Figure 7:
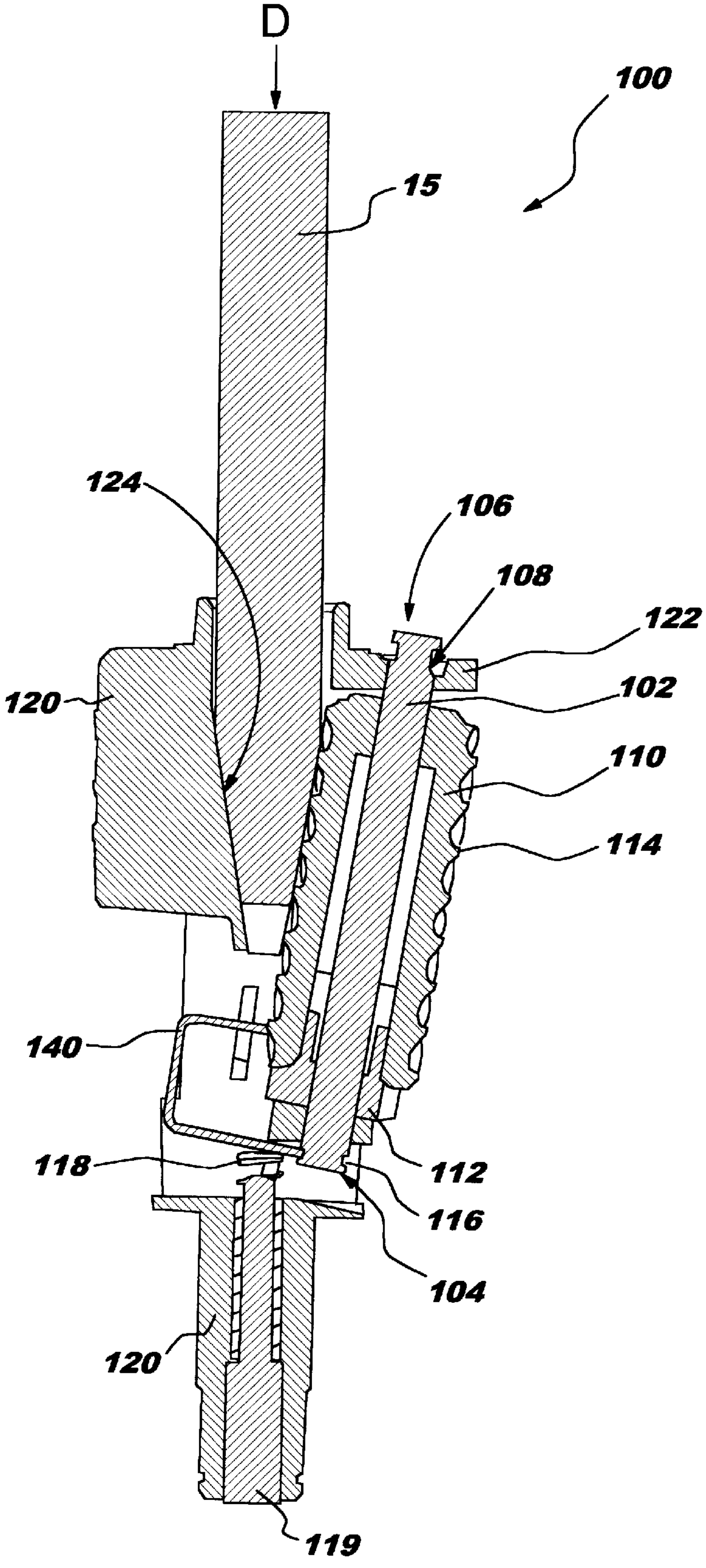
FIG. 7 is a cross-sectional view of the cutter assembly of FIG. 6, showing the rotary blade in a sharpening position.
Figure 8:
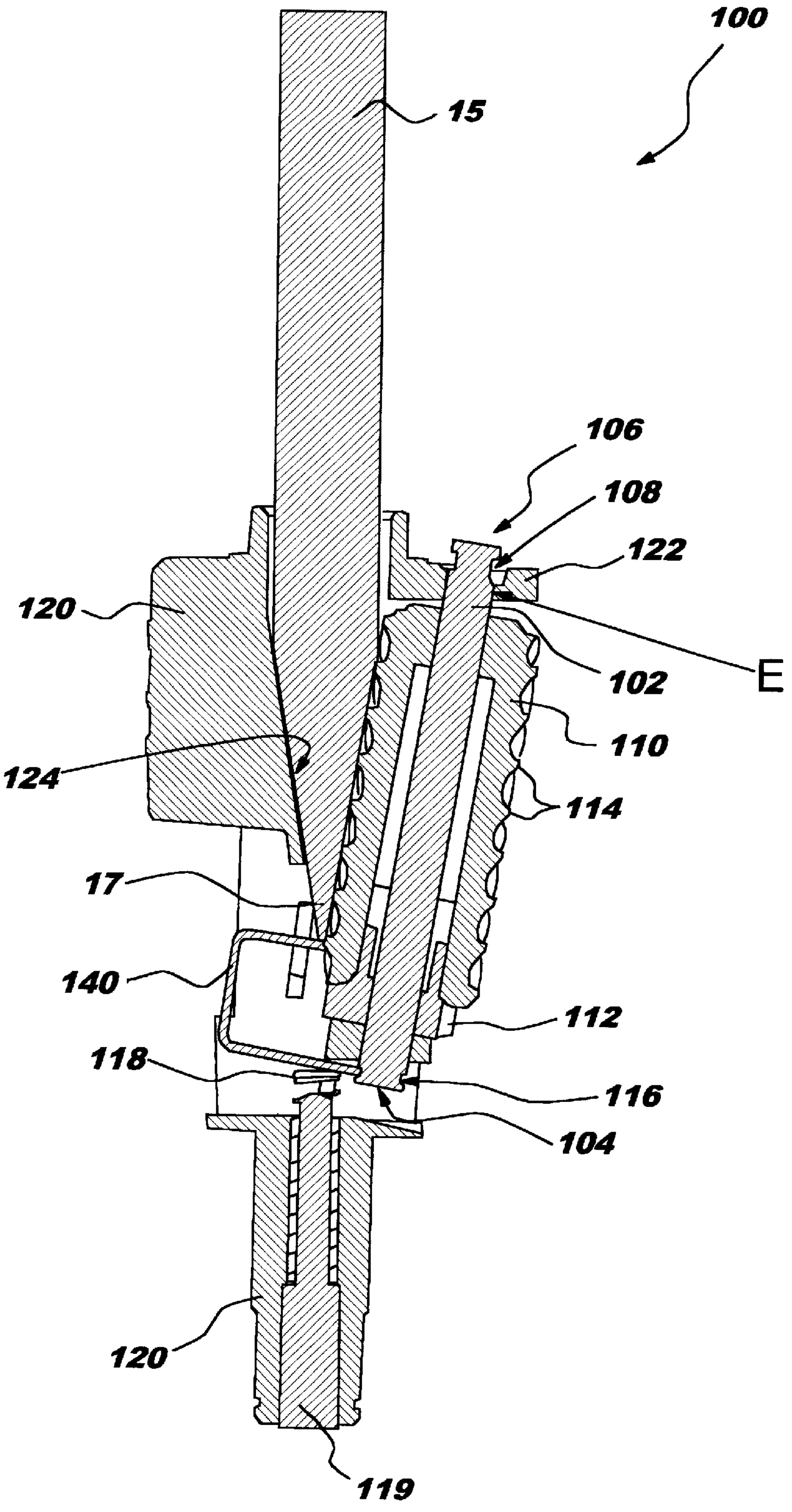
FIG. 8 is a cross-sectional view of the cutter assembly of FIG. 6, showing the pencil in a fully-sharpened position.
Figure 9:
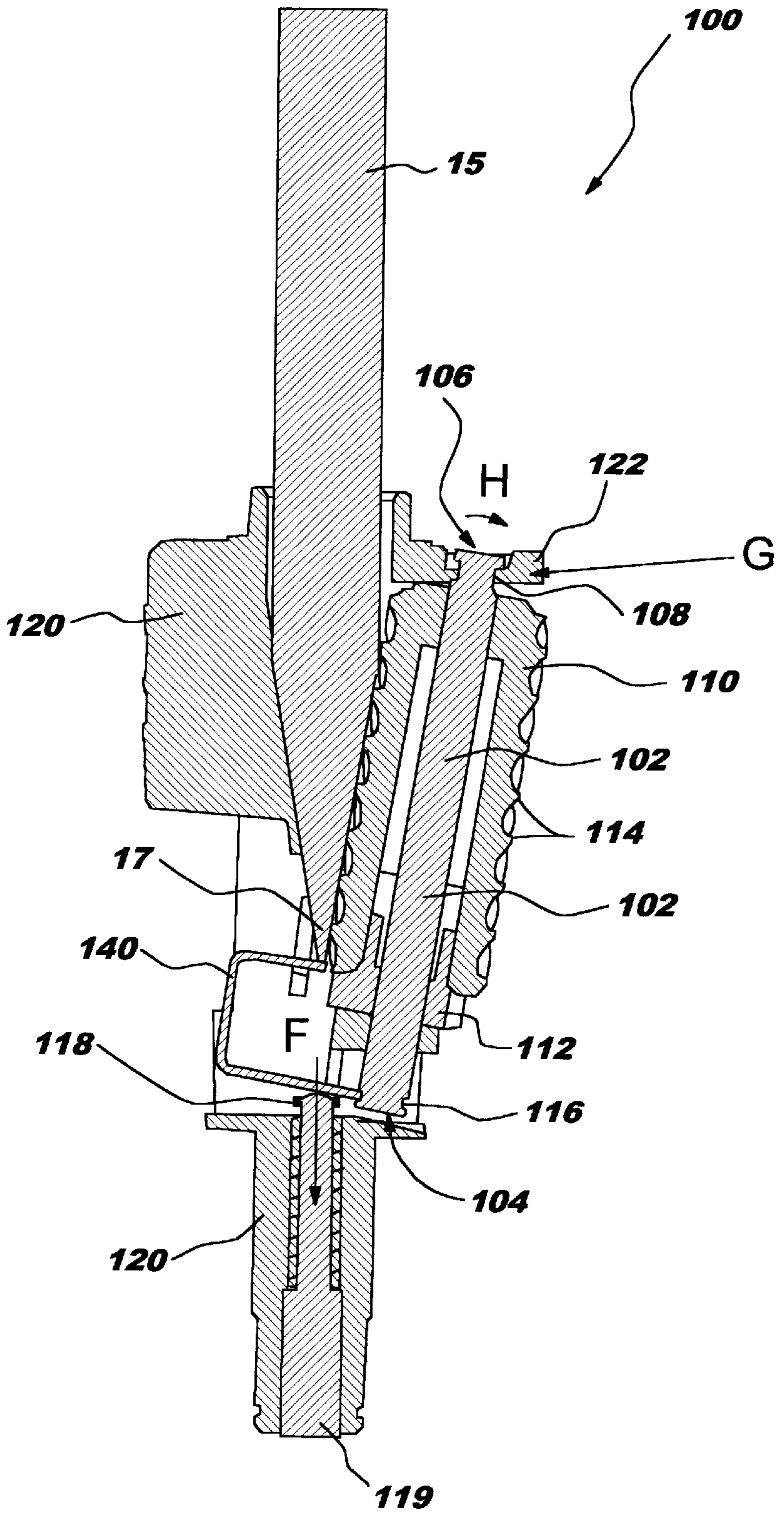
FIG. 9 is a cross-sectional view of the cutter assembly of FIG. 6, showing the cutter assembly in an inoperative position.

As shown in FIGS. 5–9, the cutter assembly 100 of the self-governing sharpening assembly also includes a stop 140. The stop 140 is slidably mounted on rails 142 of the blade holder 120 as shown in FIG. 6. The stop 140 is positioned in alignment with the conical cavity 124 and is connected to the lower end 104 of the shaft 102, as best shown in FIGS. 5 and 7. As shown in FIG. 7, the lower end 104 of the shaft 102 has an annular groove 116 for connecting to the stop 140.

Referring to FIG. 7, a spring member 118 of the cutter assembly 100 is supported by a pin 119 joined to the blade holder 120. The spring member 118 engages the stop 140 and biases the reduced diameter portion 108 of the shaft 102 away from the bearing opening 123 of the bearing lug 122 of the blade holder 120. In the embodiment shown in FIG. 7, the spring member 118 biases the shaft 102 upwardly, and therefore biases the reduced diameter portion 108 above and away from the bearing opening 123. This causes the full diameter of the shaft 102 to be accommodated by bearing opening 123 of the bearing lug 122, which causes the cutter assembly 100 to be held in a cutting position relative to a pencil 15 in the conical cavity 124.

The pencil sharpener 10 also includes a switch for engaging any pencil inserted into the pencil-receiving opening 12 of the housing 12. FIG. 4A is a front elevational view of the pencil sharpener of FIG. 1, showing the pencil sharpener with a cover 19 of the housing 12 removed. In the embodiment shown in FIG. 4A, the switch includes a switching element 40, such as a microswitch, a trigger 42, and a spring member 44. The trigger 42 is pivotably mounted to the housing 12 and has a ramped portion 46 for engagement with a pencil inserted into the pencil-receiving opening 14 of the housing 12. The trigger 42 is positioned to selectively engage and disengage the switching element 40. The spring member 44 is supported by the trigger 42 and by projection 48 of the housing 12. The ramped portion 46 forms a wedge angled from a relatively thick portion **46*a* toward a relatively thin portion 46*b*. The spring member 44 permits pivoting of the trigger 42 and biases the trigger 42 to at least partially obstruct the pencil receiving opening 14. As shown in FIG. 4A, the spring number 44 is in a relatively relaxed position and the trigger 42 is engaged with switching element 40**, causing the motor of the pencil sharpener to be at rest.

Figure 4B:
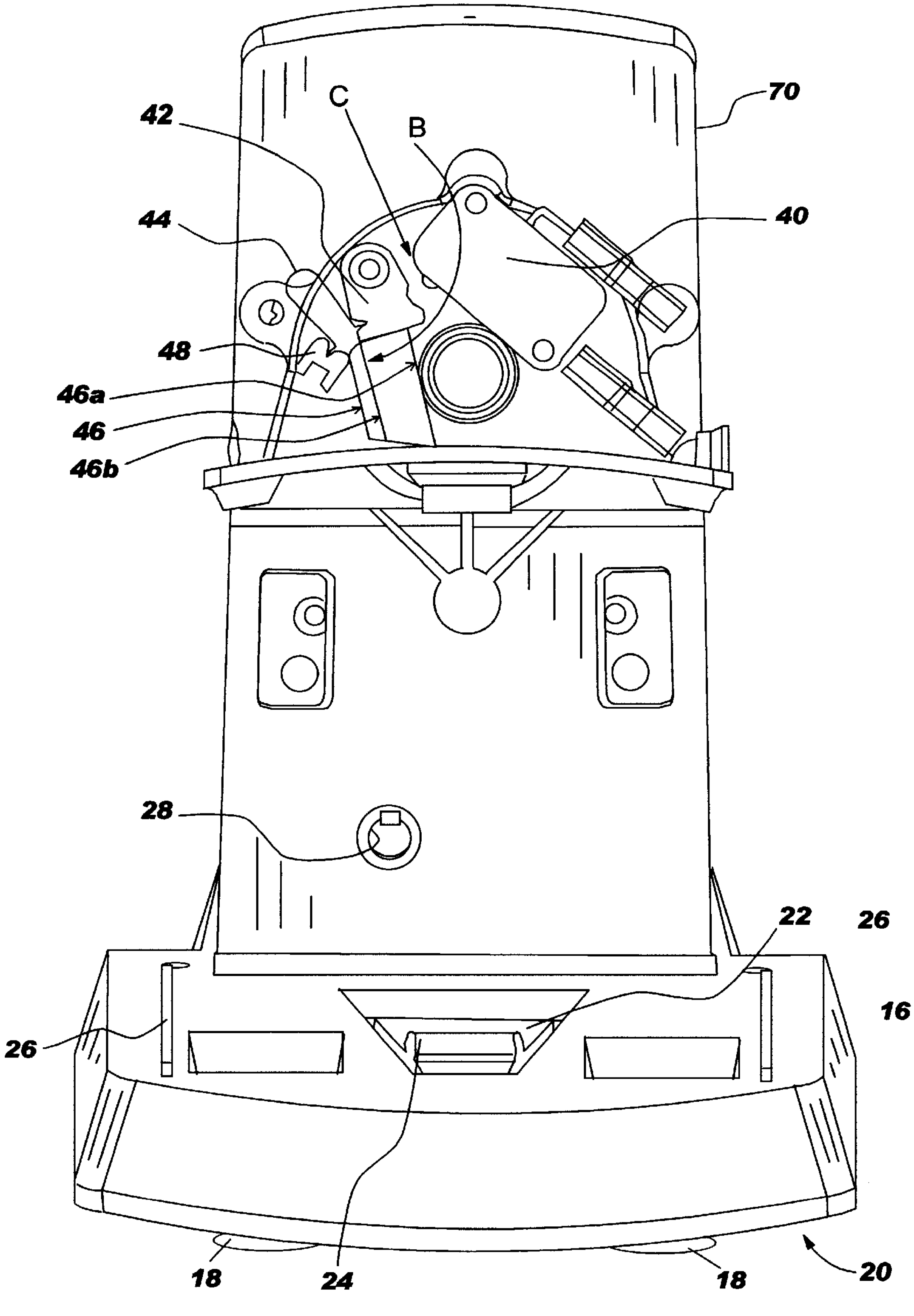
FIG. 4B is a front elevational view of the pencil sharpener of FIG. 1, showing a cover portion of the housing removed and a switch and trigger in an inoperative position..

As a pencil is inserted into the pencil receiving opening 14, a point 17 of the pencil contacts the trigger 42 and rides down the ramped portion 46. Referring now to FIG. 4B, the pencil (not shown) causes the trigger 42 to pivot in the direction shown by arrow B and to disengage the switching element 40 as shown at arrow C. As shown in FIG. 4B, the spring member 44 is compressed, leaving the pencil receiving opening 14 and the corresponding portion of the blade holder 120 unobstructed, and leaving the switching element 40 disengaged. The switching element 40 is operatively connected to electric motor assembly 132 for driving the sharpening assembly when the switching element 40 is disengaged by a pencil inserted into the pencil-receiving opening 14. In other words, in this position of the trigger 42, the motor is operable. The pencil (not shown) holds the trigger 42 in the operative position until the pencil is removed from the pencil receiving opening 14.

As referred to above, the pencil sharpener 10 also includes a receptacle 90 for receiving pencil shavings discharged by the sharpening assembly, as shown in FIG. 3. The receptacle 90 is removably matable with the housing 12, as shown in FIG. 1. As discussed above, the housing 12 may optionally include a cantilevered tang 20 having a latch portion 24. In such an embodiment, the receptacle 90 includes a complemental notch 92 for receiving the latch portion 24 when the receptacle 90 is mated with the housing 12. In an embodiment in which the housing 12 includes guide rails 26, the receptacle 90 includes complementary grooves 94 for receiving the guide rails 26. In a one embodiment, the grooves are tapered, as shown in FIG. 3.

As shown in FIG. 1, the pencil sharpener 10 also includes a selector guide 60 mounted to the housing 12. The selector guide 60 defines multiple openings 62*a*, 62*b*, 62*c*. Each of the openings 62*a*, 62*b*, 62*c* is smaller than the pencil-receiving opening 14 and has a unique size corresponding to any one of several standard pencil sizes. Each of the openings 62*a*, 62*b*, 62*c* is selectively positionable in alignment with the pencil-receiving opening 14.

In the embodiment shown in FIG. 1, the selector guide 60 is rotatably mounted to the housing 12. Additionally, the pencil sharpener 10 includes detent means for positively retaining each of the openings in alignment with the pencil-receiving opening 14. In this manner, the selector guide 60 snaps into place when any one of the openings is properly aligned with the pencil-receiving opening. As shown in FIG. 5, the detent means includes a detent ball 64 outwardly biased from the housing 12 and recesses 66 formed on the selector guide 60. Each recess 66 is positioned to receive the detent ball 64 when a corresponding opening is in alignment with the pencil-receiving opening 14. Additionally, the housing 12 includes a detent ball-receiving opening 68 for retaining the detent ball 64, and a spring member (not shown) positioned within the detent ball-receiving opening 68 for biasing the detent ball 64 into contact with the selector guide 60.

Optionally, the pencil sharpener 10 includes a safety switch 150 mounted on the housing 12. In one such embodiment, the housing 12 includes a key-receiving opening 28, as discussed above, and the receptacle 90 includes a key 96 positioned to enter the key-receiving opening 28 when the receptacle 90 is properly mated with the housing 12. The safety switch 150 is mounted adjacent the key-receiving opening 28 and operatively connected to the motor assembly 132 to prevent operation of the motor unless the receptacle 90 is mated with the housing 12 and the safety switch 150 is engaged by the key 96.

In use, a user of the pencil sharpener 10 must first ensure that the receptacle 90 is mated with the housing 12. If it is not, the user slides the receptacle 90 into a mating position with the housing 12 by positioning the guide rails 26 within the grooves 94 of the receptacle 90. This serves to properly align the receptacle 90 with the housing 12. This sliding movement causes deflection of the cantilevered tang 22 away from the receptacle 90 until the latch portion 24 becomes aligned with the complemental notch 92 of the receptacle, at which point the cantilevered tang 22 snaps back and into the latch portion 24 rests in the complemental notch 92. At this point, the receptacle 90 is properly mated with the housing 12, as shown in FIG. 1. It should be noted that the mating process causes the key 96 of the receptacle 90 to enter the key-receiving opening 28 of the housing 12 and engages the safety switch 150. Engagement of the safety switch readies the pencil sharpener for operation and protects the user from the sharpening assembly during operation.

A user of the pencil sharpener 10 then selects a pencil to be sharpened. The user then rotates the selector guide 60 until an appropriately sized opening, e.g. 62*b*, is positioned over the pencil-receiving opening 14. To ensure proper alignment of the opening 62*b* with the pencil-receiving opening 14, and hence the sharpening assembly, the user rotates the selector guide 60 until the detent ball 64 enters a recess 66 on the selector guide to positively lock the selector guide into place.

As the user inserts the pencil 15 into the pencil-receiving opening 14, a tip 17 of the pencil 15 engages the trigger's ramped portion 46 and causes the trigger 42 to compress the spring member 44 and disengage the switching element 40. Disengagement of the trigger 42 from the switching element 40 activates the motor assembly 132. It should be noted that the motor assembly would not operate if safety switch 150 were not engaged by the key 96 of the receptacle 90, indicating that the receptacle 90 is properly mated with the housing. This pivoting of the trigger 42 also permits the pencil 15 to enter the conical cavity 124 of the cutter assembly 100.

The activated motor assembly 132 rotates the drive shaft 130 and drive gear 134. This rotation drives the carrier gear 136 and the blade holder 120. As the blade holder 120 rotates about an axis of the conical cavity 124, e.g., in a clockwise direction, teeth of the pinion 112 mesh with teeth of the internal ring gear 126, which is fixed in place on the housing. This causes the pinion 112 and rotary blade 110 to rotate in an opposite direction about the shaft 102, e.g., counterclockwise. As the pencil 15 is advanced into the conical cavity 124, as shown by arrow D in FIG. 7, the pencil 15 is sharpened by the rotary blade 110 of the cutter assembly 100.

Sharpening of the pencil 15 continues until the tip 17 of the pencil 15 contacts the stop 140 as shown in FIG. 8. At this point, the pencil 15 is fully sharpened and the full diameter of the upper end 106 of the shaft 102 is accommodated by the bearing lug 122 of the blade holder 120 as shown at arrow E in FIG. 8.

As the pencil 15 is advanced further, the tip 17 of the pencil 15 slides the stop 140 along the ribs 142 against the spring bias, e.g., compressing the spring member 118 as shown by arrow F in FIG. 9. This causes the reduced diameter portion 108 of the shaft 102 to enter the bearing opening 123 of the bearing lug 122, as shown at arrow G in FIG. 9. As the blade holder 120 continues to rotate, centrifugal force causes the shaft 102 and rotary blade 110 to pivot away, as shown by arrow H, from the pencil 15 into an inoperative, non-cutting position relative to a pencil 15 in the pencil receiving cavity 124. This self-regulating feature prevents oversharpening of the pencil 15.

A user can hear and/or feel that the pencil 15 has reached the stop 140 and therefore knows to remove the pencil 15 from the pencil sharpener 10. As the pencil 15 is removed, the spring member 44 pivots the trigger 42 into engagement with the switching element 40, causing the motor to deactivate. The pencil sharpener is now at rest and ready to sharpen another pencil.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A pencil sharpener comprising:

a housing defining a pencil-receiving opening;

self-governing sharpening assembly mounted on said housing in alignment with said pencil-receiving opening for sharpening any pencil inserted therein;

a motor operatively connected to said sharpening assembly for driving said sharpening assembly; and a selector guide mounted on said housing, said selector guide defining a plurality of openings, each of said openings being smaller than said pencil-receiving opening and having a unique size corresponding to one of a plurality of common pencil sizes, each of said plurality of openings being selectively positionable in alignment with said pencil-receiving opening.

2. The pencil sharpener of claim 1, further comprising:

a receptacle removably matable with said housing for receiving pencil shavings discharged from said sharpening assembly.

3. The pencil sharpener of claim 2, further comprising:

a switch mounted on said housing for engaging any pencil inserted into said pencil-receiving opening;

wherein said switch is operatively connected to said motor and said sharpening assembly for driving said sharpening assembly when said switch is activated by any pencil inserted into said pencil-receiving opening.

4. The pencil sharpener of claim 1, wherein said selector guide is rotatably mounted to said housing.

5. The pencil sharpener of claim 1, further comprising detent means for positively retaining at least one of said plurality of openings in alignment with said pencil-receiving opening.

6. The pencil sharpener of claim 5, said detent means comprising:

a detent ball outwardly biased from said housing; and at least one recess formed on said selector guide, said at least one recess being positioned to receive said detent ball when one of said plurality of openings is in alignment with said pencil-receiving opening.

7. The pencil sharpener of claim 6, said housing further comprising:

a detent ball-receiving opening for receiving said detent ball; and a spring member positioned within said detent ball-receiving opening for biasing said detent ball into contact with said selector guide.

8. The pencil sharpener of claim 2, further comprising:

a safety switch mounted on said housing for engagement with said receptacle when said receptacle is mated to said housing, said safety switch being operatively connected to said motor to prevent operation of said motor unless said receptacle is mated with said housing.

9. The pencil sharpener of claim 8, said receptacle comprising a key, said housing further comprising a key-receiving opening adjacent said safety switch for receiving said key when said receptacle is mated with said housing, whereby said motor is prevented from operating by said safety switch unless said safety switch is engaged by said key.

10. The pencil sharpener of claim 2, said housing further comprising a cantilevered tang having a latch portion, said receptacle further comprising a complemental notch for receiving said latch portion when said receptacle is mated with said housing.

11. The pencil sharpener of claim 2, said housing and said receptacle comprising interengageable guides for mating said receptacle to said housing.

12. The pencil sharpener of claim 11, wherein said interengageable guides comprise a guide rail and a groove for receiving said guide rail.

13. The pencil sharpener of claim 1, said self-governing sharpening assembly comprising:

a blade-supporting shaft having a lower end and an upper end, said upper end having a reduced diameter portion;

a rotary blade and a pinion carried co-axially on said shaft, said rotary blade having spiral cutting edges;

a blade holder defining a conical cavity for receiving an end of a pencil therein and having a bearing lug defining a bearing opening sized to rotatably support said upper end of said shaft, said blade holder being supported by said housing to be rotatable around an axis of said conical cavity;

an annular ring gear fixedly supported by said housing and meshing with said pinion;

a drive shaft which drives said blade holder around said axis;

a stop slidably mounted to said blade holder in alignment with said conical cavity, said stop being connected to said lower end of said shaft; and a spring member supported by said blade holder, said spring member engaging said stop and biasing said reduced diameter portion of said shaft away from said bearing opening of said bearing lug;

whereby a pencil advanced into said conical cavity is sharpened by said rotary blade until said pencil is sufficiently sharpened, at which point said pencil moves said stop against the spring bias, causing said reduced diameter portion of said shaft to enter said bearing opening of said bearing lug, said reduced diameter portion being sized relatively to said bearing opening to allow for pivotal movement of said shaft and said rotary blade away from said pencil under influence of centrifugal force produced by rotation of said blade holder around the axis of said conical cavity.

14. The pencil sharpener of claim 13, said lower end of said shaft comprising an annular groove, said stop being connected to said lower end of said shaft by fitting with said annular groove.

15. The pencil sharpener of claim 13, wherein said drive shaft is connected to a drive gear and said blade holder is connected to a carrier gear meshing with said drive gear.

16. The pencil sharpener of claim 15, said housing further comprising a mounting bracket, said mounting bracket supporting said carrier gear, said drive shaft, and said blade holder.

17. The pencil sharpener of claim 3, wherein said switch comprises a trigger; and a spring member for biasing said trigger to at least partially obstruct said pencil-receiving opening.

18. A self-governing sharpening assembly comprising:

a housing;

a blade-supporting shaft having a lower end and an upper end, said upper end having a reduced diameter portion;

a rotary blade and a pinion carried co-axially on said shaft, said rotary blade having spiral cutting edges;

a blade holder defining a conical cavity for receiving an end of a pencil therein and having a bearing lug defining a bearing opening sized to rotatably support said upper end of said shaft, said blade holder being supported by said housing to be rotatable around an axis of said conical cavity;

an annular ring gear fixedly supported by said housing and meshing with said pinion;

a drive shaft which drives said blade holder around said axis;

a stop slidably mounted to said blade holder in alignment with said conical cavity, said stop being connected to said lower end of said shaft; and a spring member supported by said blade holder, said spring member engaging said stop and biasing said reduced diameter portion of said shaft away from said bearing opening of said bearing lug;

whereby a pencil advanced into said conical cavity is sharpened by said rotary blade until said pencil is sufficiently sharpened, at which point said pencil moves said stop against the spring bias, causing said reduced diameter portion of said shaft to enter said bearing opening of said bearing lug, said reduced diameter portion being sized relatively to said bearing opening to allow for pivotal movement of said shaft and said rotary blade away from said pencil under influence of centrifugal force produced by rotation of said blade holder around the axis of said conical cavity.

19. A pencil sharpener comprising:

a housing defining a pencil-receiving opening;

a self-governing sharpening assembly mounted on said housing in alignment with said pencil-receiving opening for sharpening any pencil inserted therein, said self-governing sharpening assembly comprising a blade-supporting shaft having a lower end and an upper end, said upper end having a reduced diameter portion, a rotary blade and a pinion carried co-axially on said shaft, said rotary blade having spiral cutting edges, a blade holder defining a conical cavity for receiving an end of a pencil therein and having a bearing lug defining a bearing opening sized to rotatably support said upper end of said shaft, said blade holder being supported by said housing to be rotatable around an axis of said conical cavity, an annular ring gear fixedly supported by said housing and meshing with said pinion, a drive shaft which drives said blade holder around said axis, a stop slidably mounted to said blade holder in alignment with said conical cavity, said stop being connected to said lower end of said shaft, and a spring member supported by said blade holder, said spring member engaging said stop and biasing said reduced diameter portion of said shaft away from said bearing opening of said bearing lug, whereby a pencil advanced into said conical cavity is sharpened by said rotary blade until said pencil is sufficiently sharpened, at which point said pencil moves said stop against the spring bias, causing said reduced diameter portion of said shaft to enter said bearing opening of said bearing lug, said reduced diameter portion being sized relatively to said bearing opening to allow for pivotal movement of said shaft and said rotary blade away from said pencil under influence of centrifugal force produced by rotation of said blade holder around the axis of said conical cavity; and a receptacle removably matable with said housing for receiving pencil shavings discharged from said sharpening assembly.

20. The pencil sharpener of claim 19, further comprising:

a switch mounted on said housing for engaging any pencil inserted into said pencil-receiving opening; and a motor operatively connected to said sharpening assembly and said switch for driving said sharpening assembly when any pencil is inserted into said pencil-receiving opening.

21. The pencil sharpener of claim 20, further comprising:

a selector guide mounted on said housing, said selector guide defining a plurality of openings, each of said openings being smaller than said pencil-receiving opening and having a unique size corresponding to one of a plurality of common pencil sizes, each of said plurality of openings being selectively positionable in alignment with said pencil-receiving opening.

22. A self-governing sharpening assembly comprising:

a housing;

a blade-supporting shaft having a lower end and an upper end;

a rotary blade carried co-axially on said shaft, said rotary blade having a cutting edge;

a blade holder defining a cavity for receiving an end of a pencil therein and having a bearing lug defining a bearing opening sized to rotatably support said upper end of said shaft, said blade holder being supported by said housing to be rotatable around an axis of said cavity;

a stop slidably mounted to said blade holder in alignment with said cavity, said stop being connected to said lower end of said shaft; and a spring member supported by said blade holder, said spring member engaging said stop and biasing said shaft to an operative position in which said rotary blade is capable of sharpening a pencil advanced into said cavity;

whereby said shaft and said bearing lug are complementarily configured to pivot said shaft from said operative position to an inoperative position responsive to longitudinal translation of said shaft, and whereby a pencil advanced into said cavity is sharpened by said rotary blade until said pencil is sufficiently sharpened, at which point said pencil moves said stop against the spring bias, causing said shaft to translate longitudinally relative to said bearing lug and to pivot said shaft and said rotary blade away from said pencil into said inoperative position under influence of centrifugal force produced by rotation of said blade holder around the axis of said cavity.

* * * * *